Sept. 20, 1971 J. J. HOVORKA 3,605,974

MULTIPLE COIN ACTUATING DEVICE

Filed Nov. 12, 1969 6 Sheets-Sheet 1

INVENTOR.

Jiri J. Hovorka

BY

Dunlap, Laney, Hessin & Dougherty

ATTORNEYS

MULTIPLE COIN ACTUATING DEVICE

INVENTOR.
Jiri J. Hovorka
BY
Dunlap, Laney, Hessin & Dougherty
ATTORNEYS

Sept. 20, 1971 J. J. HOVORKA 3,605,974

MULTIPLE COIN ACTUATING DEVICE

Filed Nov. 12, 1969 6 Sheets-Sheet 3

INVENTOR.

Jiri J. Hovorka

BY

Dunlap, Laney, Hessin & Dougherty

ATTORNEYS

MULTIPLE COIN ACTUATING DEVICE

Filed Nov. 12, 1969 6 Sheets-Sheet 4

INVENTOR.

Jiri J. Hovorka

BY

Dunlap, Laney, Hessin & Dougherty

ATTORNEYS

MULTIPLE COIN ACTUATING DEVICE

Filed Nov. 12, 1969

INVENTOR.
Jiri J. Hovorka
BY
Dunlap, Laney, Hessin & Dougherty
ATTORNEYS

MULTIPLE COIN ACTUATING DEVICE

Filed Nov. 12, 1969 6 Sheets-Sheet 6

INVENTOR.
Jiri J. Hovorka
BY
Dunlap, Laney, Hessin & Dougherty
ATTORNEYS

United States Patent Office 3,605,974
Patented Sept. 20, 1971

3,605,974
MULTIPLE COIN ACTUATING DEVICE
Jiri J. Hovorka, Oklahoma City, Okla., assignor to Pyramid Manufacturing Company, Oklahoma City, Okla.
Filed Nov. 12, 1969, Ser. No. 875,659
Int. Cl. G07f *5/00*
U.S. Cl. 194—55 15 Claims

ABSTRACT OF THE DISCLOSURE

Apparatus for receiving and registering acceptance of a prescribed number and combination of coins which apparatus is readily adjustable to accept various denomination combinations of both U.S. and foreign coin monies after satisfaction of a triple verification. The apparatus consists of a coin slide member operating through a housing member which includes a metering assembly consisting of an arcuate rotor, arcuate stator and arcuate control rotor operating in coaction to sense an arcuate segmental measure of one or more coins equaling a predetermined monetary value. The apparatus relies upon a measure of coin diameter relationships to effect coin deposits upon validity sensing, and coin rejection upon failure of validity sensing.

BACKGROUND OF THE INVENTION

(1) Field of the invention

The invention relates generally to a coin or coins acceptance mechanism and, more particularly, but not by way of limitation, it relates to an improved multi-coin slide for use in receiving any of various, pre-determined monetary values.

(2) Description of the prior art

The prior art includes various types of coin slide mechanisms serving in diverse areas of the automated and machine merchandising industry for the purpose of accepting the required amounts of coin money input thereby to enable satisfaction of a payment requirement. There have been numerous approaches as to the size and type of mechanics and/or electronics employed in such acceptance device as the early devices generally consisted of separate slides for each coin denomination with such slide installations being relatively permanent regarding any intention for periodic change of pricing in the field. Still other acceptance devices have been developed which are capable of accepting plural coins in one input slot or collector whereupon they are then evaluated either mechanically or electronically as to denomination and as to whether or not the monetary value is satisfied. U.S. Pat. No. 3,372,786, a rotary coin device invented by the present inventor, would exemplify such prior teachings.

SUMMARY OF THE INVENTION

The present invention contemplates a coin acceptor device utilizing a plurality of verification checks as effected by a coin slide for carrying a predetermined number of one or more coins of proper denomination into a housing member which positions a coin sensing mechanism for coaction with the slide conveyed coins. The coin sensing mechanism is constructed to form an arcuate coin path as formed by a rotor member having an arcuate surface movable with respect to a stator member having a complementary arcuate edge. A control rotor is then positioned for similar pivotal movement with said rotor member such that one or more control rollers slidably retained at the arcuate edge of the rotor are selectively received at predetermined arcuate positions of said control rotor to release and effect a measured displacement of the rotor thereby to open a discharge coin trap which enables ejection of the validating coins into a deposit container or such. Rotation of the control rotor relative to the rotor member and the stator is effected by movement of the coin slide bearing the correct combination of coin or coins, which coin slide must make actuating contact with the rotor simultaneously with release of the control rollers.

It is also a primary aspect of the invention that the requirement of monetary values and particular denominations for a coin acceptor device can be readily changed by simply substituting one or both of the control rotor and the slide member, and the assembly characteristics of the coin acceptor device are such that these substitutions may be readily carried out in the field or at various retailing locations.

Therefore, it is an object of the present invention to provide a coin acceptor which can receive coins totaling a selected value upon a single coin slide actuation.

It is also an object of the invention to provide such a coin slide device which is capable of receiving any combination of coin or coins of various denominations and predetermined monetary value with a single coin slide actuation.

It is still further an object of the present invention to provide a single actuation coin acceptor device which can be readily changed as to its acceptor characteristics such that replacement of one or two easily replaced parts enables validation of a different, selected monetary value.

It is yet another object of the invention to provide triple safety control over a single actuation coin acceptor device wherein coins are sensed in at least three ways for proper coin denomination with continuance of the acceptance function enabled only upon satisfaction of plural verifications.

Finally, it is an object of the present invention to provide a coin validating device which is relatively simple, yet fool-proof and reliable, and which has multi-coin, selectable value capability.

Other objects and advantages of the invention will be evident from the following detailed description when read in conjunction with the accompanying drawings which illustrate the invention.

DETAILED DESCRIPTION OF THE INVENTION

Figure 1:
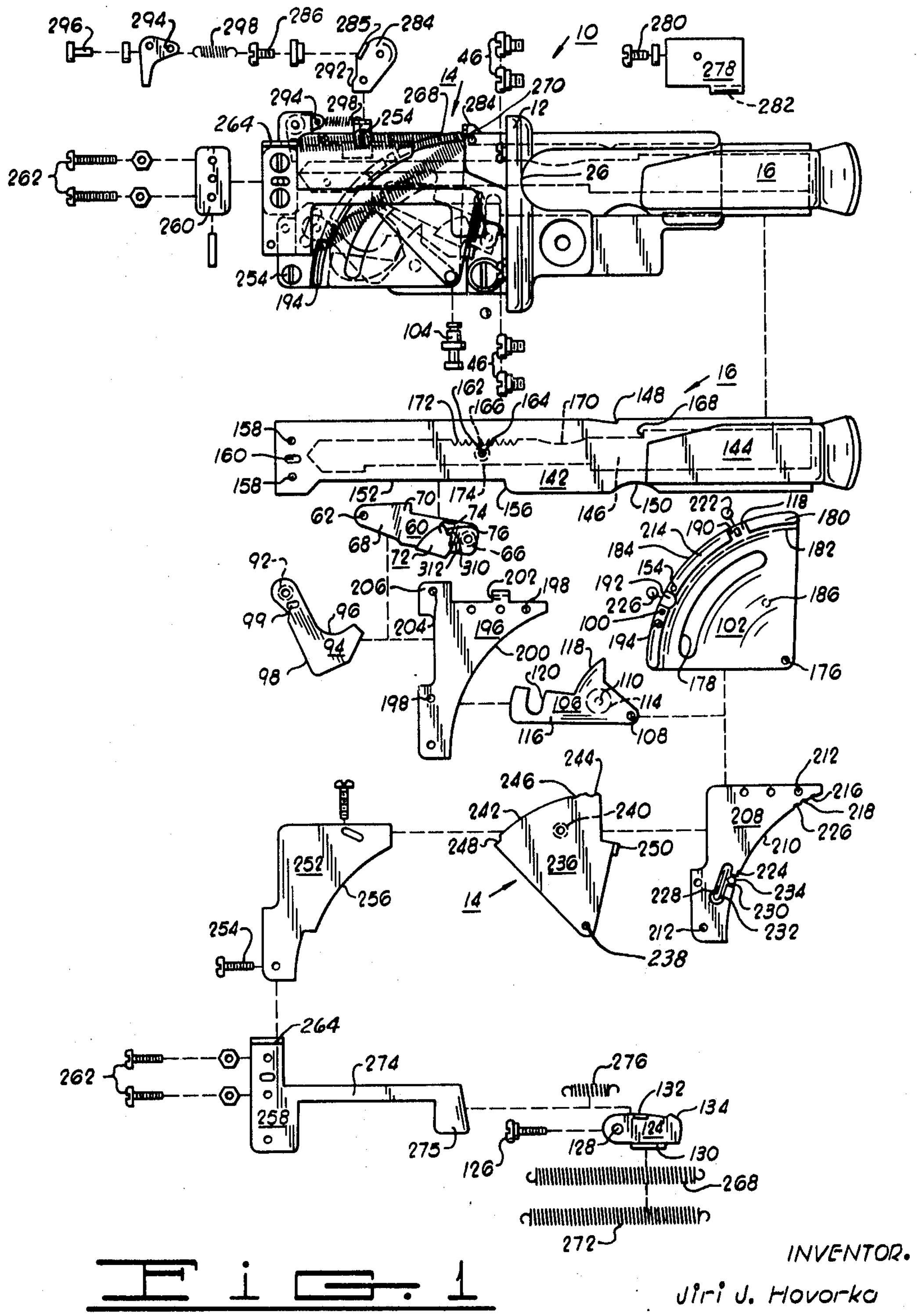
FIG. 1 is a top plan view of the invention with selected parts shown duplicated in exploded position.

Referring now to FIG. 1, a coin acceptor device 10 consists of a main housing 12 which supports a metering assembly 14 and a slide assembly 16 in coactive disposition. Individual components of the slide assembly 16 and the metering assembly 14 are described hereafter and, as will become more apparent below, some of such parts may be varied to enable changing of the denomination and amounts to be accepted by the coin acceptor device 10.

Figure 2:
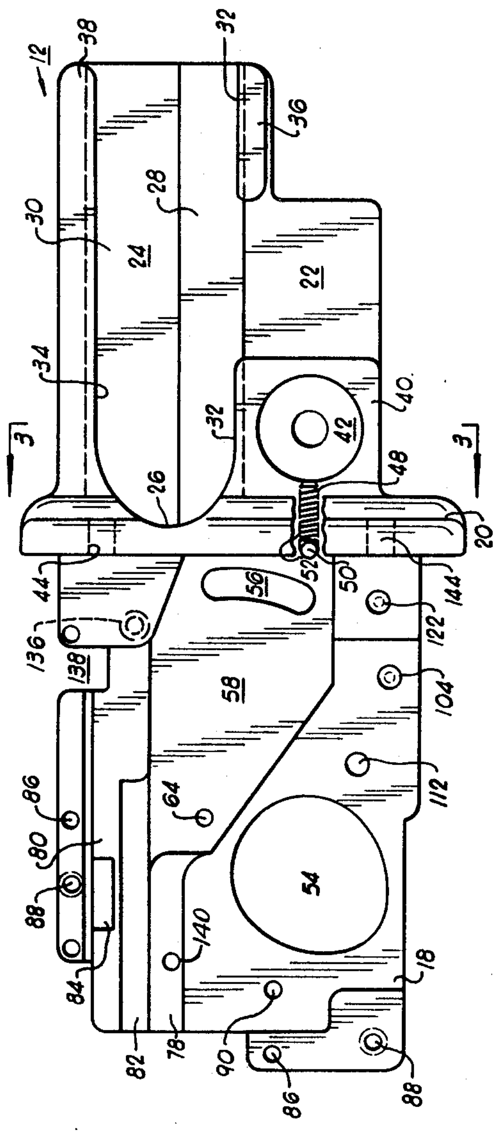
FIG. 2 is a top plan view of a housing assembly constructed in accordance with the invention.
Figure 3:
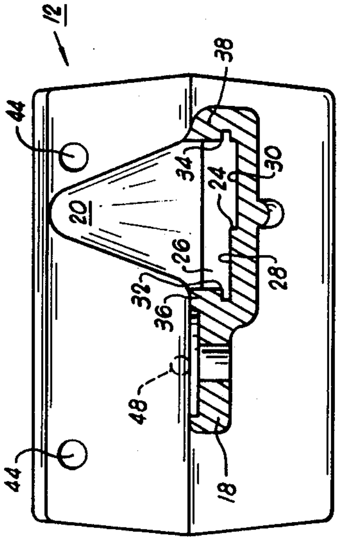
FIG. 3 is a section taken along lines 3—3 of FIG. 2.

The main housing 12 defines the structural body of the device and it consists of a die cast form having a horizontal portion 18 and a vertical securing plate portion 20. Referring also to FIGS. 2 and 3, the horizontal portion 18 of main housing 12 includes a coin receiving area 22 adjacent to a milled out slide way 24 which leads through the vertical securing plate 20 to define a generally rectangular slide opening 26 which, in turn, leads back and into the area of acceptor device 10 which supports the metering assembly 14.

The slideway 24 is formed to have a first slide surface 28 and, adjacent to that, a more deeply milled base slide surface 30, each of slide surfaces 28 and 30 extending rearwardly through the slide opening 26. A left overhang 32 and a right overhang 34 are formed on opposite sides of slideway 24 by means of the casting edge portions 36 and 38 to form a locked-in tracking way for the slide assembly 16. A raised portion 40 of the housing casting includes an indented circular area 42 for receiving an insert plate or medallion (not shown) which serves to identify the required coin value of the coin acceptor device 10. The vertical securing plate 20 is formed to have a plurality of threaded holes 44 for receiving fasteners or screws 46 therein for the purpose of securing the coin acceptor device 10 to the front panel of a vending machine utilizing the device. An additional bore 48 extends forward through vertical securing plate 20 at about the level of raised portion 40, this serving to house a tensioning ball 50 and load spring 52, as will be further described below.

The rearward portion of main housing 12 is formed with two openings (FIG. 2), a coin deposit hole 54 and an elongated, arcuate hole 56 which aids in the tensioning of a coin sensing part as will be further described below. A lower milled portion 58 provides an operating surface for a coin sensor 60 (see exploded FIG. 1), which coin sensor 60 is pivotally affixed by simple fastening means through a hole 62 of coin sensor 60 and a hole 64 through the bottom of the milled portion 58. A post 66 secured beneath coin sensor 60 extends downward through elongated hole 56 such that coin sensor 60 is capable of limited pivotal movement about its pivotal affixure, i.e., through hole 64. The coin sensor 60 is formed as a bottom plate 68 which includes a slide latch cam 70 formed on one side thereof, and, on the opposite side, an upwardly bent portion 72 is formed to extend back across but spaced above the bottom plate 68 as a sensor arm 74 having a plurality of lock teeth 76.

Remaining slide surfaces 78 and 80 are formed coplanar with base slide surface and a rectangular groove 82 is formed therebetween to release tension on the slide assembly as will be further described. A vertical hole 84 through the horizontal portion of the main housing 12 receives a slide stop member therethrough, as will be further described. A pair of guide holes 86 receive guide pins therethrough for alignment of remaining parts of the assembly, and threaded holes 88 serve to receive fasteners which secure the assembly.

A hole 90 serves as a pivot receiving position for pivotally receiving a securing post 92 of a coin trap door 94. The trap door 94 is optimally formed to have an inner arc edge 96 and an outer, generally rectangular edge 98, and it is actuated about post 92 and hole 90 by movement of a pin 100 on the underside of a rotor 102, pin 100 being operatively inserted down within an oval hole 99 in trap door 94. A pivot post 104 is secured in main housing 12 to receive various moving parts of the metering assembly 14 as will be further described. Thus, pivot post 104 first receives an ejector plate 106 in locked position. Ejector plate 106 receives pivot post 104 through hole 108 while a lower post 110 extends downward to lock through a hole 112 in main housing 12. A collar portion 114 about post 110 serves to space the ejector plate 106 at a sufficient height above the adjacent surface of main housing 12. A knife edge 116 serves as a downward coin deflector for accepted coin passing through the deposit hole 54, and a semi-circular surface 118 delineates maximum clearance for coins being guided therethrough. A cutout portion 120 provides clearance for other moving parts of the metering assembly 14, as will be further described.

A threaded hole 122 (FIG. 2) serves to receive pivotally a lock plate 124 ( see exploded FIG. 1) in pivotal affixure. Thus, a pivotal fastener 126, e.g. a screw fastener having an upper collar portion, extends through a hole 128 of lock plate 124 so that it is pivotally held about the axis of threaded hole 122. Lock plate 124 includes a right-angle bent portion 130 which serves to bear against the spring loaded tensioning ball 50, while a second right-angle bent arm 132 provides a spring retaining post. A toothed end 134 provides ratchet engagement with the lock teeth 76 of coin sensor 60. A threaded hole 136 serves for positioning of a safety lock (to be further described) as it operates in conjunction with a side hole 138 which extends into the slide surface 80. Still another threaded hole 140 provides a means for securing a slide stop (also to be described) which extends a stopping block or flange up through the rectangular hole 84.

The slide assembly 16 consists of a slide plate 142 having a handle portion 144 secured thereon as by welding. A slide base 146 is then secured in firm affixure beneath the slide plate 142. The slide plate 142 includes a safety lock notch 148 as well as a rounded out portion 150 which aids in insertion of coins. An elongated notch 152 is formed for coaction with a control pin 154, which also extends downward on the underside of rotor 102 as will be further described in greater detail. An actuating edge 156 of the notch 152 is tapered at about six degrees from the perpendicular across slide plate 142. Securing holes 158 and guide hole 160 serve for securing and positioning of a return plate assembly as will be further described.

The slide base 146 is secured as by spot welding beneath the slide plate 142 and a tensioning ball 162 is retained by loose capture within oppositely-disposed conical holes 164 and 166 through the respective slide plate 142 and slide base 146. The slide base 146 includes various side cuts such as a slide stop notch 168, a clearance notch 170, and a plurality of ratchet teeth 172 for coaction with a ratchet lock as will be further described. An elongated control notch 174 is disposed to coact with the coin sensor 60. It should be understood that the slide base 146 may be slightly varied, i.e. the configuration and length of control notch 174, depending upon the denominations and combinations of coins to be accepted, and these alternatives will be discussed in greater detail below.

Referring now to individual parts of FIG. 1, and as shown also in FIGS. 4 through 8, the rotor 102 is formed with a pivot hole 176 and an arcuate clearance hole 178. The outer radius of rotor 102 is formed as an arcuate ridge 180 on the upper side having a continuous and wider arcuate flange 182 formed about the under side. The arcuate flange 182 extends outward and is coterminous with the outer circular edge 184 of rotor 102. A stop member 186 is disposed on the underside of rotor 102 to provide a stopping surface as it bears against an adjacent point of the ejector plate 106. The arcuate ridge 180 includes various control configurations including the previously mentioned control pins 100 and 154 which extend downward therethrough to extend on the order of one-sixteenth inch below the arcuate flange 182. A plurality of radially directed milled-out slide ways 188, 190 and 192 provide space for receiving control rollers therein in radially movable manner. The function and number of control rollers will be further discussed below. A spring retaining post 194 is affixed to extend vertically from arcuate ridge 180.

A base plate 196 is affixed on the end of main housing 12 by positioning a pair of guide holes 198 over respective guide holes 86 and securing with conventional force-fit guide pins. An inner arcuate edge 200 of base plate 196 will then be brought into concentric, sliding position next to the circular edge 184 of rotor 102. When positioned, the upper surface of base plate 196 is coplanar with the upper surface of circular edge 18 such that the arcuate ridge 180 extends upward thereover. An arm portion 202 provides a spring retaining position for coaction with a ratchet assembly as pivotally affixed through securing hole 204 in the extended corner 206 of base plate 196.

A stator 208 having an inner arcuate edge 210 is then affixed down over base plate 196 by alignment of guide holes 212 with guide pins. The inner arcuate edge 210 of stator 208 is then juxtapositioned to the outer edge 214 of arcuate ridge 180 of rotor 102. Inner arcuate edge 210 of stator 208 includes circular indentations 216, 218 and 220 for selected coaction with control rollers 222, see also FIG. 8, and a circular indentation 224 is formed to coact with the control roller 226. An elongated hole 228 and channel 230 provide seating for a spring member 232 and locking roller 234.

A control rotor 236 is then positioned for sliding disposition on top of rotor 102 as it is pivotally affixed with pivot post 104 inserted through a pivot hole 238. An inverted conical guide pin 240 secured beneath the inner control roller 236 is disposed slidably within clearance hole 178 in rotor 102. An outer arcuate edge 242 is then disposed in juxtaposition to inner arcuate edge 210 of stator 208, and a plurality of control indentations such as 244, 246 and 248 are positioned to coact with the control rollers 222 and 226 in a manner to be described. The positioning of guide pin 240 and each of the respective control indentations 244, 246 and 248 are variably disposed as between different ones of the control rotors as selected for particular combinations and denominations of coins, i.e. whatever value it is desired that the coin acceptor device 10 validate. Such alternative structures coact with similar variations and configuration of the slide base 146 as will be further described below in greater detail. A right-angle bend 250 of control rotor 236 serves both as a spring actuating lever (to be described) and a rotor return lever.

A cover plate 252 is then secured over the stator 208 and the outer arcuate edge 242 of control rotor 236 to maintain all operative components in proper position. Screw fasteners 254 secure the assembly as they are affixed within the threaded holes 88 of the main housing 12. An inner curved edge 256 is formed so that it overlaps the juxtapositioning interface of arcuate edge 210 of stator 208 and outer arcuate edge 242 of control rotor 236. The overlap of inner curved edge 256 serves to maintain the control rollers 222 and 226 in proper operative position.

A return plate 258 is formed to provide the return function of all interactive elements after coin actuation. Thus, return plate 258 is secured on top of the inner end of slide plate 142 atop a spacer member 260 as secured by fasteners 262. The return plate 258 has a right-angle bend 264 which extends upward for the purpose of receiving a return spring 268, the other end of which is affixed to a spring connector post 270. The spring connector post 270 is also the affixure for a rotor return spring 272 which is affixed at the other end to a spring retaining post 194 on top of the rotor 102. The return plate 258 is then formed with a forward extension 274 having a return bumper 275. Bumper 275 serves to abut against the right-angle bend 250 of control rotor 236 to return the mechanism to zero of the start position.

The lock plate 124 as secured by pivotal fastener 126 is urged under spring pressure from a tension spring 276 connected between the right-angle bent arm 132 of lock plate 124 and the right-angle bend 250 of control rotor 236.

A slide stop 278 is secured beneath main housing 12 (see FIG. 4) by means of a fastener 280 to extend a bent portion or stop 282 upward through vertical hole 84 into interfering position relative to the slide surface 80. The stop 282 then sets the limit of insertion of the slide 142 as slide stop notch 168 of slide base 146 makes contact therewith. A safety lock 284 is pivotally connected by a pivotal fastener 286 (see FIG. 4) so that it sustains continual urging by means of tension spring 288, connected between a downwardly extending right-angle bend 290 of lock plate 284 and the vertical post 66 on the underside of coin sensor 60, vertical post 66 extending through the elongated slot 56 of main housing 12. The safety lock 284 is also formed to have an upwardly extending right-angle bend 292 which extends for removable insertion within the side hole 138 of main housing 12 in urging contact with the forward, outer corner of rotor 102.

Figure 4:
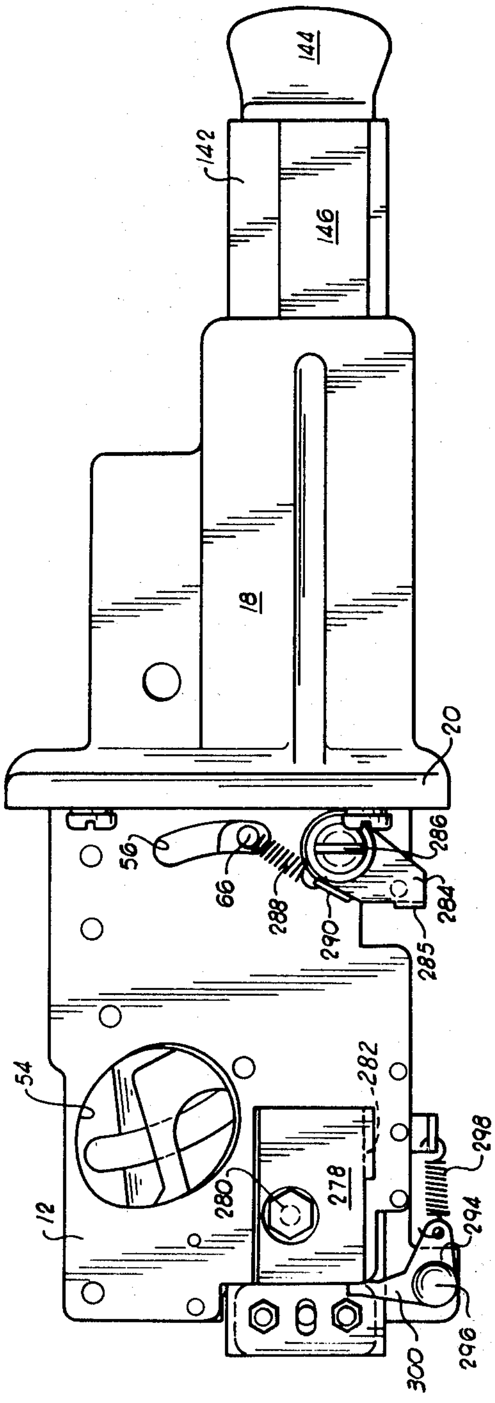
FIG. 4 is a bottom plan view of the invention.
Figure 5:
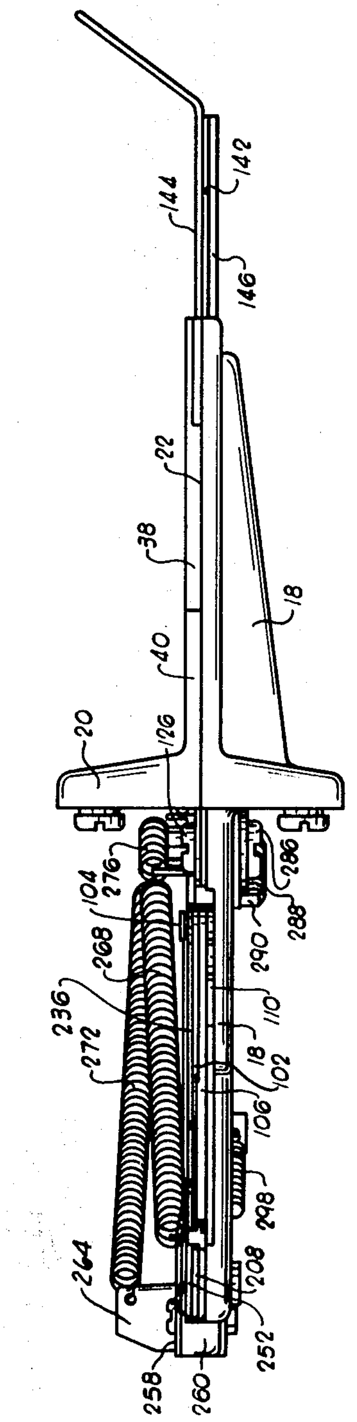
FIG. 5 is a side elevational view of the invention.
Figure 6:
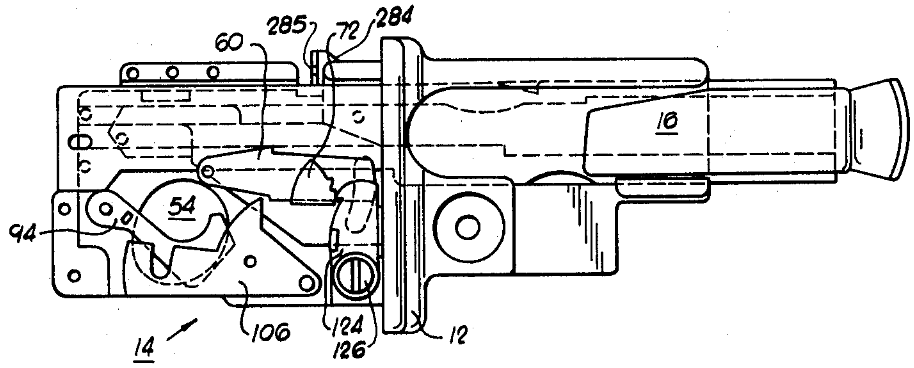
FIG. 6 is a top plan view of the invention with major components of the metering assembly removed.
Figure 7:
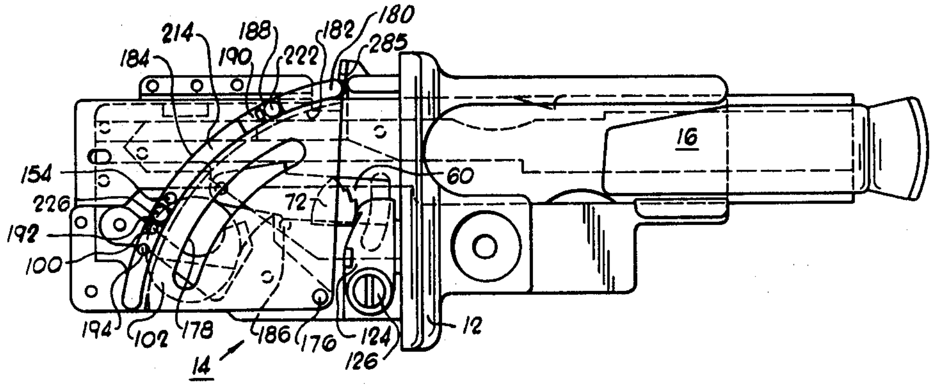
FIG. 7 is a top plan view of the invention as shown in FIG. 6 with the rotor member of the metering assembly added.
Figure 8:
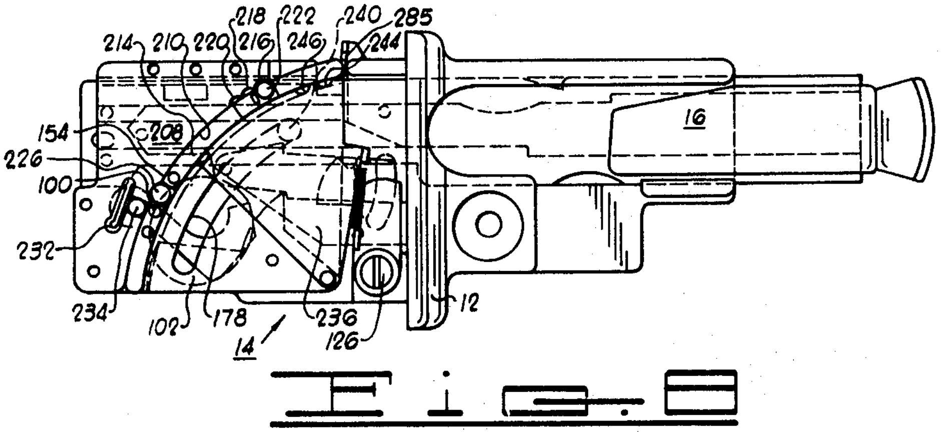
FIG. 8 is a top plan view of the invention as shown in FIG. 8 with the control rotor and stator member of the metering assembly added.
Figure 9:
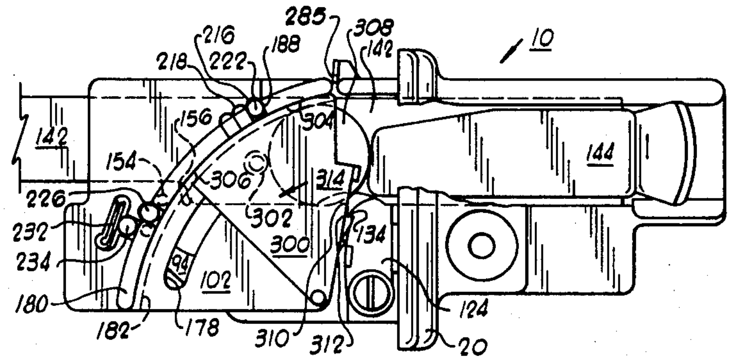
FIG. 9 is a functional diagram of the coin acceptor device with parts cut away to illustrate operative positioning at the beginning of an acceptance cycle.
Figure 10:
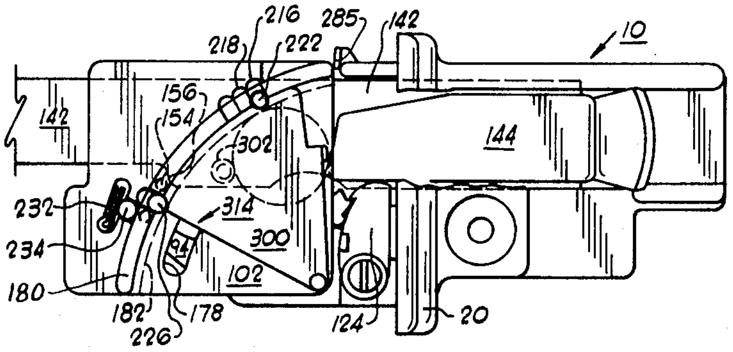
FIG. 10 is a functional diagram illustrating an operative positioning advanced from that of FIG. 9.

A ratchet 294 is secured by means of a pivotal fastener 296 to the underside of main housing 12 as shown in FIG. 4. The ratchet 294 is continually urged by a tension spring 298 so that a pawl extension 300 is held in contact with one side of slide base 146 and the ratch teeth 172. The tension spring 298 is retained by a right-angle arm portion 202 extending downward from the base plate 196.

OPERATION

The operation of the coin acceptor device 10 is described with particular reference to FIGS. 9 through 12 which show an interrelationship of actuating components in sequential views. The sequence views of FIGS. 9 through 12 are made with relation to a coin acceptor device 10 which is adapted to receive twenty-five cent denominations. Thus, as will become more apparent from additional discussion, a control rotor 300 is formed such that it has a guide pin 302 located at a predetermined position relative to the arc of control rotor 300. Similarly, a pair of control indentations 304 and 306 are also formed at a proper arcuate position to receive a twenty-five cent denomination coin or quarter 308.

The quarter 308 is placed on the slide way 24, i.e. slide plate 142, whereupon handle portion 144 is pushed inward through slide opening 26 (FIG. 2) such that the leading edge of handle portion 144 urges quarter 308 inward along the slide path. The forward portion of handle portion 144 is formed with a slight taper to impart a component of lateral urging to quarter 308 as it progresses into the slide opening 26.

Upon further insertion of slide plate 142 and quarter 308, the coin sensor 60 is actuated to release lock plate 124 (See FIG. 6) to hold the slide passage open for reception of quarters. This is a first verification test which must be satisfied. Thus, the slide latch cam 70 (FIG. 1) is contacted by the quarter to force coin sensor 60 into pivotal movement such that sensor arm 74 is moved toward the pivot point of lock plate 124. The toothed end 134 of lock plate 124 then catches in an outer tooth 310 of sensor arm 74, which outer tooth 310 indicates or allows passage of quarters. In other cases, insertion of nickels will displace coin sensor 60 such that an intermediate notch 312 is engaged, and passage of dimes is verified if the coin does not actuate the coin sensor 60 to any locking point.

Further insertion of quarter 308 then bears against guide pin 302 tending to rotate control rotor 300 in the direction of arrow 314. The quarter 308 is received immediately below rotor 102 and urged over against the arcuate flange 182 to be carried therearound. Under urging of quarter 308 on guide pin 302, control rotor 300 continues its rotation until a next simultaneity of actuation which will enable rotation of rotor 102 as well as continued rotation of control rotor 300. The simultaneous actuations are: first, the control indentation 304 aligns with the slide way 188 to allow inward movement of control roller 222 into the control indentation 304 such that it is free from locking engagement within circular indentation 216 of stator 208; and second, an actuating cam 156 of slide plate 142 bears against control pin 154 beneath rotor 102 to move rotor 102 arcuately in the direction of arrow 314. Unless the previous two actuations occur simultaneously, neither can succeed, and slide plate 142 and quarter 308 are stopped short of actuation completion with subsequent rejection of the coin offering.

Figure 11:
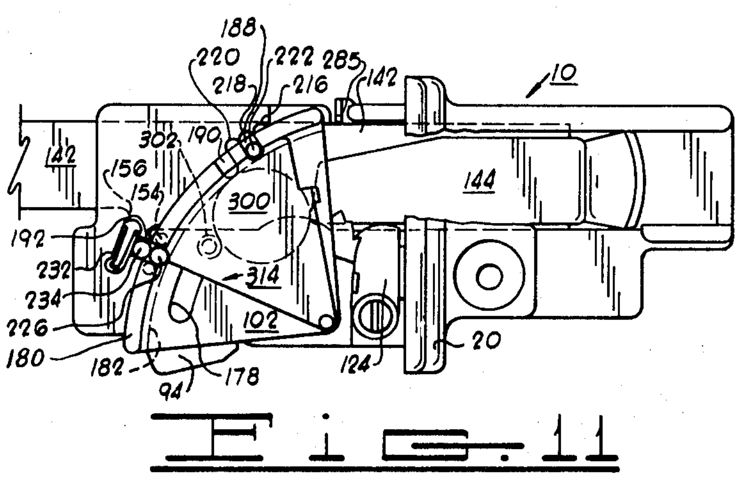
FIG. 11 is a functional diagram illustrating an operative positioning advanced from that of FIG. 10.
Figure 12:
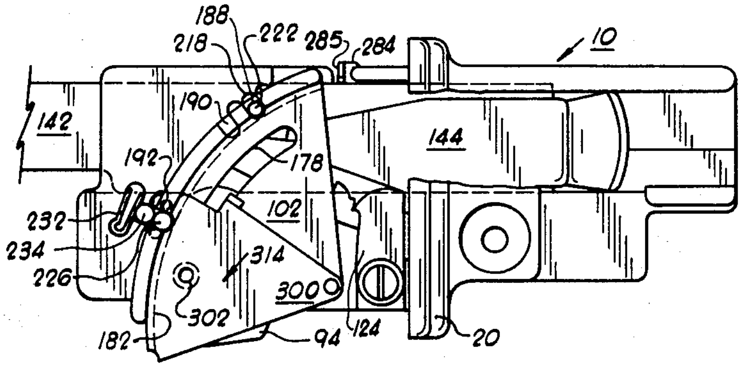
FIG. 12 is a functional diagram of the acceptor device which illustrates operative positioning at the end of the acceptance cycle.

When the two actuations are simultaneous, the rotor 102 and control rotor 300 are rotated to take the posture of FIG. 11. That is, rotor 102 is rotated about pivot post 104 by about ten degrees, which rotation actuates coin trap door 94 to its open position such that the coin deposit hole 54 (FIG. 2) is open to allow passage of deposited coins. This actuation comes about by virtue of the fact that the underside of pin 100, through the outer edge of rotor 102, extends down within the oval hole 99 of trap door 94 (see FIG. 1). Also, the control rotor 300 is moved in the direction of arrow 314 whereupon control rollers 222 and 226 are forced outward within respective circular indentation 218 and channel 230, respectively, to allow further rotation of control rotor 300. That is, there is further rotation as urged by quarter 308 bearing against guide pin 302.

The further rotation of control rotor 300 then progresses under the urging of quarter 308. That is, control roller 222 is urged within circular identation 218 while control roller 226 is urged up against the locking roller 234 and spring member 232. Finally, after control rotor 300 has progressed in the arcuate direction 314 to the position shown in FIG. 12, the quarter 308 drops through the coin deposit hole 54 for retention in a suitable coin box or other escrow device.

A suitable form of actuation device utilized in combination with the coin acceptor device 10 may then be operated in response to successful deposit of coin or coins through the coin deposit hole 54. Thus, e.g. such actuation may be effected by a switch device actuated upon insertion of slide plate 142 by a predetermined distance. Many and varied switching devices may be employed, either mechanical, light-responsive or whatever, and this will generally follow accepted practice in particular areas of coin vending machine application.

While the foregoing has been described with respect to acceptance of a U.S. quarter through successful coin deposit, it is a valuable attribute of the present invention that it can be programmed for acceptance of various combinations of coins of a certain denomination merely by replacement of one metering and/or slide assembly components. Thus, the inner control rotor 300, as shown in FIGS. 9 through 12, will accept either a quarter or the twenty-five cent value as made up by two dimes and a nickel. This is enabled due to the fact, that control rotor 300 is rotated to an actuating position by the series linkage consisting of contiguous positioning of a nickel and two dimes as forced around the inner side of arcuate flange 182 or rotor 102 by means of the handle portion 144 of the slide base 142. Since the contiguous nickel and two dimes forms a much longer actuating distance than that for a quarter, actuation takes place when (a) the control indentation 304 aligns with slideway 192 and control roller 226, simultaneous with (b) the contact of control pin 154 against slide way actuating cam 156, the combined actuation serving to rotate rotor 102. This simultaneous actuation being made, the remainder of the coin deposit sequence is the same as the control rotor 300 proceeds in the direction of arrow 314 until the nickel and two dimes is each deposited through coin deposit hole 54.

Figure 13A:
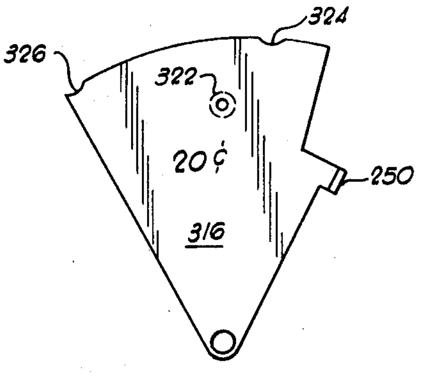
FIGS. 13A, 13B and 13C illustrate three exemplary forms of alternative control rotor which may be utilized in the invention.
Figure 13B:
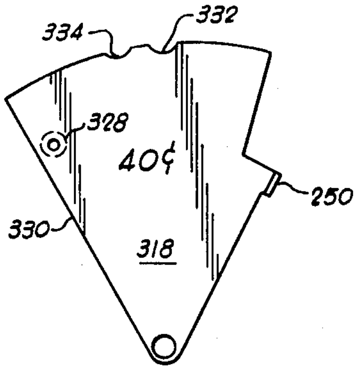
Figure 13C:
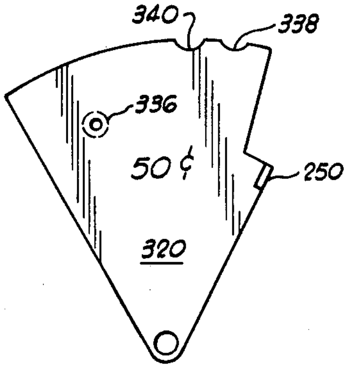

FIGS. 13A, 13B and 13C show additional control rotors 316, 318 and 320 which may be used for additional coin selection values. Thus, as shown in FIG. 13A, the control roller 316 is programmed or dimensioned for use in receiving twenty cent coin values. A guide pin 322 is disposed at about the middle of the arc of control roller 316 while a control indentation 324 serves for actuation in response to two dimes inputs, and a control indentation 326 serves for actuation in response to input of two nickels and one dime. In each case, the control rotor actuation must be simultaneous with the contact of slide way actuating cam 156 and the control pin 154 beneath rotor 102.

FIG. 13B shows still another control roller 318 having a guide pin 328 located nearly to the left radial edge 330. A control indentation 332 provides forty cent actuation in response to input of a quarter, dime and nickel bearing against guide pin 328, while four dimes input is actuated by lineup of control identation 334 with a more distant slide way 192 and control roller 226. In the same manner, the coin acceptor device 10 can be programmed for reception of fifty cents value by use of a control roller 320 (FIG. 13C). The guide pin 336 is disposed on the left central side of the arcuate control 320 while control indentations 338 and 340 are properly spaced to provide necessary actuation in accordance with the arcuate dimension of the input coins, e.g. two quarters in sequential relationship or one fifty cent piece. The control indentation 338 provides actuation in response to the two quarter input as well as a lock function at the end of the arcuate sweep of control rotor 300.

The coin selector device 10 can be programmed to accept any combination and total of U.S. or foreign coin inputs by merely changing the control rotor 300 to one of selected dimension and by providing the proper slide base 146 having the required dimension as to control notch 174 for contacting the actuating cam 156. The device utilizes only two control roller positions for each coin value setting. Thus, the extreme slide ways 188 and 192 are employed for twenty cent, thirty cent, twenty-five cent and thirty-five cent input programming configurations. The forty cent, forty-five cent and fifty cent actuations utilize control rollers which are positioned in respective slide ways 190 and 192.

In each of the above cases, the control rotor will be particularly dimensioned as to the arcuate position of the guide pin and the arcuate position of the control indentations as was previously described with respect to FIGS. 13A through C. Although some standardization can be relied upon, it is also usual and required to replace the particular slide base for specific coin values as it is necessary that actuating cam 154 be positioned so that it will actuate the rotor 102 (through control pin 154) simultaneously with control roller actuation or line-up of whatever the selected control rotor.

After coin acceptance and actuation, the coin acceptor device 10 can be replaced into the ready position by withdrawing the slide assembly 16 back out of slide opening 26. Thus, as shown in FIG. 1, the slide assembly 16 is withdrawn, and in so doing it actuates various replacement functions which ready the coin acceptor device 10 for a next following coin input. As slide assembly 16 is withdrawn, the return plate 258 supports return bumper 275 for contact with a right-angle bend 250 of control rotor 236 (or whatever the selected control rotor) which in turn, causes rotation of the control rotor 236 to bear against a right-angle bent arm 132 of lock plate 124. This bearing upon lock plate 124 then pushes right-angle bent portion 130 against the tensioning bar 50 to disengage lock teeth 76 and sensor arms 74 thereby to allow coin sensor 60 to return to its lock-out position.

There are various other safety locks which find actuation at particular points in the sequence of operation. Thus, the ratchet 294 engages the ratchet teeth 172 of slide base 146 to prevent withdrawal of slide assembly 16 after actuation has begun. In other words, after the actuating sequence is begun, the deposit coins can no longer be removed, and the actuation sequence can only proceed in the forward manner. After actuation is completed, a slide base stop notch 168 makes contact with a stop 282 of slide stop 278 which sets the limit of the actuating distance of slide assembly 16. The safety lock 284 is operated in response to pivotal movement of coin sensor 60 which brings safety block 285 into interefering contact with safety notch 148 of slide 142. This safety measure guards against piracies utilizing a slide or slug of improper diameter which might be utilized to actuate coin sensor 60 and rotor 102 rotatably. A proper actuation of the (1) coin sensor 60 and (2) the simultaneous actuation to rotate the rotor 102 will cause (3) the withholding of safety block 285 so that operation can proceed. If for any reason rotor 102 is prevented from returning, the block 285 will be at its inward position within opening 138 whereupon it will interfere with notch 148 upon insertion of slide 142.

It should be understood that while round, flat rollers such as control rollers 222 and 226 are specifically illustrated, it is within contemplation that various movable devices of assorted shapes may be utilized to perform the function of selectively connecting the stator 208, rotor 102 and control rotor 236 (or other types depending upon the denomination setting). It is also contemplated that such as double-ended spring loads may be utilized within the interacting rotatable elements.

The foregoing illustrates a novel coin acceptor device which utilizes relatively few moving parts to carry out an extremely accurate and reliable coin acceptance function. The device is capable of use for any of various coin values and combinations by simply substituting one or sometimes two of the component parts, such substitution being readily made in the field by average-skill attendants.

The invention is susceptible of more economical production methods and materials as it can be constructed from interrelated parts which are predominantly stamped and forged with reduced requirements for die casting and milling. While the invention stresses the simplicity and economy of structure, it is by no means a limiting factor since the coin acceptor device has an extremely high reliability quotient, both as to the non-cheat attributes and the maintenance-free service characteristics.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A coin acceptor device for receiving coin or coins of predetermined value comprising:

housing means including a slideway portion;

a slide means reciprocally movable within said slideway and including an actuating cam portion and a handle portion securing said coin or coins for movement with said slide means;

a pivot means affixed on said housing means;

control rotor means having an arcuate outer edge and which is rotatable about said pivot means, said control rotor means being disposed for contact by said coin or coins thereby to be rotated about said pivot means an arcuate distance which is proportional to the movement of said slide means;

rotor means having an arcuate outer edge, said rotor means being rotatable about said pivot means and rotatable relative to said control rotor means;

first control means actuatable to secure said rotor means to said control rotor means for movement therewith;

second control means actuatable by said slide means actuating cam portion simultaneous with actuation of said first control means to rotate said rotor means and control rotor means to enable receiving deposit of said coin or coins.

2. A coin acceptor device as set forth in claim 1 wherein said second control means comprises:

actuating post means disposed to extend vertically from a preset position on said rotor means outer edge for contact with said slide means actuating cam portion upon insertion of the slide means a predetermined distance as determined by said coin or coins.

3. A coin acceptor device as set forth in claim 1 which is further characterized to include:

safety lock means pivotally affixed to said housing means and including a block portion which is pivoted into interfering contact with said slide means unless said rotor means is properly at a return position.

4. A coin acceptor device as set forth in claim 1 wherein said first control means comprises:

stator means affixed to said housing means adjacent to said rotor means and having a concave arcuate side which is disposed adjacent to said control rotor means and said rotor means, said concave arcuate side having plural indentations disposed at spaced dispositions;

control roller means radially movably retained adjacent the outer edge of said rotor means, said control roller means being held in contact with said control rotor means outer edge such that it is normally forced within one of said indentations to prevent relative movement between said stator means and rotor means and actuatable at predetermined rotational position of said control rotor means to allow relative movement between said stator means and rotor means.

5. A coin acceptor device as set forth in claim 4, wherein said second control means comprises:

actuating post means disposed to extend vertically from a preset position on said rotor means outer edge for engagement with said slide means actuating cam portion, said rotor means being rotatable in response thereto only upon simultaneous actuation of said first control means.

6. A coin acceptor device as set forth in claim 4 which is further characterized in that:

said control rotor means has an indentation disposed at a predetermined position on said arcuate outer edge; and said control rotor means includes guide pin means affixed to extend below said control rotor means for contact with said coin or coins, said guide pin means being positioned at a predetermined position relative to the radius between said control rotor means pivot and said outer edge indentations, which position is determined by said coin or coins.

7. A coin acceptor device as set forth in claim 1 which is further characterized in that:

said control rotor means has an indentation disposed at a predetermined position on said arcuate outer edge; and said control rotor means includes guide pin means affixed to extend below said control rotor means for contact with said coin or coins, said guide pin means being positioned at a predetermined arcuate position relative to the radius between said control rotor means pivot and said outer edge indentations, which arcuate position is determined by said coin or coins.

8. A coin acceptor device as set forth in claim 7 which is further characterized in that:

said rotor means includes an arcuate flange on the underside of said arcuate outer edge and said coin or coins are moved about said arcuate flange contiguous to the underside of said rotor means, and said rotor means includes an arcuate clearance hole for receiving said control rotor means guide pin means downward therethrough to be contacted by said coin or coins.

9. A coin acceptor device as set forth in claim 7, which is further characterized to include:

third control means pivotally affixed to said housing means and normally extending across said slide means, said third control means including a cam portion normally extending into interfering contact with said slide means to prevent insertion at a predetermined point, and said third control means including a second cam portion extending across said slide means for interfering contact with said coin or coins to move said third control means about its pivot thereby to move said first cam portion out of interfering contact and permit insertion.

10. A coin acceptor device as set forth in claim 9 which is further characterized to include:

spring actuated holding means for holding said third control means at each of plural pivotal positions in response to respective plural different coin engagements with said first cam portion.

11. A coin acceptor device as set forth in claim 1 which is further characterized to include:

third control means pivotally affixed to said housing means and normally extending across said slide means, said third control means including a cam portion normally extending into interfering contact with said slide means to prevent insertion at a predetermined point, and said third control means including a second cam portion extending across said slide means for interfering contact with said coin or coins to move said third control means about its pivot thereby to move said first cam portion out of interfering contact to permit insertion of said slide means.

12. A coin acceptor device as set forth in claim 11, which is further characterized to include:

spring actuated holding means for holding said third control means at each of plural pivotal positions in response to respective plural different coin engagements with said first cam portion.

13. A coin acceptor device as set forth in claim 12, which is further characterized to include:

return means affixed to said slide means to extend a contact portion for contacting said control rotor means such that upon withdrawal of said slide means from said housing means the contact portion moves said control rotor means to a non-actuation position whereupon it bears on said spring activated holding means to release said third control means such that it prevents insertion of said slide means.

14. A coin acceptor device as set forth in claim 1 which is further characterized to include:

return means affixed to said slide means to extend a contact portion for contacting said control rotor means such that upon withdrawal of said slide means from said housing means the contact portion moves said control rotor means to a non-actuation position.

15. A coin acceptor device as set forth in claim 14, which is further characterized to include:

safety lock means pivotally affixed to said housing means and including a block portion which is pivoted into interfering contact with said slide means unless said rotor means is properly at a return position.

References Cited

UNITED STATES PATENTS

| | | | |
|---|---|---|---|
| 1,158,722 | 11/1915 | Rosenstengel | 194—74 |
| 1,975,461 | 10/1934 | Isele | 194—55 |
| 2,364,939 | 12/1944 | Benjamin | 194—55 |
| 3,338,366 | 8/1967 | Hall | 194—99X |

ROBERT B. RUVES, Primary Examiner

T. E. KOCOVSKY, Assistant Examiner

U.S. Cl. X.R.

194—74, 99, 102